US008682526B2

(12) United States Patent
Mola et al.

(10) Patent No.: US 8,682,526 B2
(45) Date of Patent: Mar. 25, 2014

(54) CONTROL OF A CONDENSER FAN OF AN AUTOMOTIVE AIR-CONDITIONING SYSTEM

(75) Inventors: Stefano Mola, Orbassano (IT); Carloandrea Malvicino, Orbassano (IT); Domenico Idone, Orbassano (IT)

(73) Assignee: C.R.F. Societá Consortile per Azioni (IT)

( * ) Notice: Subject to any disclaimer, the term of this patent is extended or adjusted under 35 U.S.C. 154(b) by 481 days.

(21) Appl. No.: 12/991,670

(22) PCT Filed: Mar. 26, 2009

(86) PCT No.: PCT/IB2009/005130
§ 371 (c)(1),
(2), (4) Date: Feb. 28, 2011

(87) PCT Pub. No.: WO2009/136241
PCT Pub. Date: Nov. 12, 2009

(65) Prior Publication Data
US 2011/0137522 A1 Jun. 9, 2011

(30) Foreign Application Priority Data

May 9, 2008 (EP) .................................... 08425320

(51) Int. Cl.
*B60K 37/06* (2006.01)
(52) U.S. Cl.
USPC .................................. 701/36; 62/181; 62/184
(58) Field of Classification Search
USPC ........................................ 701/36; 62/181, 184
See application file for complete search history.

(56) References Cited

U.S. PATENT DOCUMENTS

| | | | | |
|---|---|---|---|---|
| 4,590,772 A | * | 5/1986 | Nose et al. | 62/184 |
| 5,245,836 A | * | 9/1993 | Lorentzen et al. | 62/174 |
| 5,678,410 A | * | 10/1997 | Fujita et al. | 62/7 |
| 5,752,391 A | * | 5/1998 | Ozaki et al. | 62/228.1 |
| 6,293,123 B1 | * | 9/2001 | Iritani et al. | 62/409 |
| 6,347,528 B1 | * | 2/2002 | Iritani et al. | 62/324.6 |
| 2006/0086113 A1 | | 4/2006 | Errington et al. | |
| 2007/0125106 A1 | | 6/2007 | Ishikawa et al. | |
| 2009/0000322 A1 | * | 1/2009 | Hatakeyama | 62/228.3 |
| 2010/0161134 A1 | * | 6/2010 | Takahashi | 700/276 |

FOREIGN PATENT DOCUMENTS

| | | |
|---|---|---|
| EP | 1495886 A1 | 1/2005 |
| EP | 1749681 A2 | 2/2007 |

OTHER PUBLICATIONS

"International Application Serial No. PCT/IB2009/005130, International Search Report mailed Jun. 5, 2009", 3 pgs.
"International Application Serial No. PCT/IB2009/005130, Written Opinion mailed Jun. 5, 2009", 5 pgs.

* cited by examiner

*Primary Examiner* — Mussa A Shaawat
*Assistant Examiner* — Ariel Yu
(74) *Attorney, Agent, or Firm* — Schwegman Lundberg & Woessner, P.A.

(57) ABSTRACT

Described herein is a automotive air-conditioning system configured to implement a sub-critical refrigerating cycle and comprising a condenser and a fan associated thereto, a compressor, an evaporator, an expansion valve of the non-electronically-controlled type, and an electronic control system configured to receive a signal indicative of the ambient temperature outside the vehicle and to generate a control signal for the fan of the condenser on the basis of the ambient temperature outside the vehicle.

16 Claims, 4 Drawing Sheets

CONTROL OF A CONDENSER FAN OF AN AUTOMOTIVE AIR-CONDITIONING SYSTEM

RELATED APPLICATIONS

This application is a nationalization under 35 U.S.C. 371 of PCT/IB2009/005130, filed Mar. 26, 2009 and published as WO 2009/136241 A1 on Nov. 12, 2009, which claimed priority under 35 U.S.C. 119 to European Patent Office Application No. 08425320.2, filed May 9, 2008; which applications and publication are incorporated herein by reference in their entirety.

TECHNICAL FIELD

The present subject matter relates to the control of a condenser fan of a automotive air-conditioning system.

BACKGROUND

As it is known, motor vehicles are generally provided with air-conditioning systems of the type comprising, in succession, a compressor, a condenser, an expansion valve, and an evaporator, connected to one another via a duct through which a coolant, generally Freon, flows.

As refrigerating fluids (or coolants) use is typically made of fluids such as ammonia, methyl chloride, sulphurous anhydride; halogenated hydrocarbons such as Freon (for example R11, R12, R114, R134a), or, further, substances like carbon dioxide and hydrocarbons like propane.

In particular, air-conditioning systems of the type described above are generally configured to implement a sub-critical refrigerating cycle of the type illustrated in FIG. 1A, i.e. a refrigerating cycle wherein the maximum pressure at which the refrigerating fluid is compressed and to which reference is generally made as condensation pressure, is always below the critical pressure $p_c$ characteristic of the refrigerating fluid itself. Under those conditions, as a matter of fact, along the high-pressure tract of the cycle condensation of the refrigerating fluid occurs, the refrigerating fluid thereby yielding heat to the outside, i.e. a thermal exchange takes place between a condensing fluid (which shall be partly in the liquid state and partly in the vapour state) and a gas (generally air). Air-conditioning systems are further provided with a fan which is arranged downstream of the evaporator and is operated to push conditioned air into the passenger compartment of the motor vehicle, and a fan which is arranged in front of the condenser and is operated automatically to maintain the coolant pressure in the condenser (condensation pressure) at optimal values in all operating conditions. Operation of the condenser fan determines, in fact, an increase in the air flowrate impinging upon the condenser, thus determining a reduction of the condensation pressure.

The condenser fan is operated both for reasons of safety, i.e., to prevent the coolant pressure in the condenser from reaching the tightness pressure of the pipes in the air-conditioning system in which the coolant flows, and to maintain an acceptable performance of the air-conditioning system. A condensation pressure that is excessively high, in fact, causes a consequent increase in the coolant pressure in the evaporator and, hence, also of the conditioned air temperature at the evaporator outlet.

Typically, the switching-on, switching-off, and the rotation speed of the condenser fan are controlled via a pressure switch calibrated on a number of threshold values of the condensation pressure. When each of these threshold values is exceeded, the condenser fan is operated at a corresponding rotation speed. In the majority of air-conditioning systems of modern motor vehicles, the condenser fan is operated at two levels, so that when a lower threshold value is exceeded the condenser fan is driven at a lower rotation speed, whereas when a higher threshold value is exceeded the condenser fan is driven at a higher rotation speed.

In order to enable efficient energy management of the air-conditioning system, in more recent models of motor vehicles, the pressure switch is increasingly more frequently replaced by a linear pressure sensor, whilst the condenser fan is controlled with PWM (Pulse Width Modulation) techniques.

Such a control of the condenser fan entails, however, the disadvantage of not taking into account the impact that the use of the condenser fan has on the overall energy balance of the motor vehicle. As is known, in fact, the compressor behaves like a pump that operates between two pressure levels and, consequently, it may be readily appreciated how the more the coolant pressure at the evaporator output approaches the coolant pressure at the condenser inlet, the smaller the work that the compressor has to do to bring the coolant to the required pressure and, consequently, the smaller the mechanical power that the compressor absorbs from the internal combustion engine.

In fact, even though operation of the condenser fan for reducing the condensation pressure results in a reduction of the work that the compressor has to perform to bring the coolant pressure to the required value, operation of the condenser fan results, on the other hand, in an increase in the electric power absorbed from the alternator, and, since the latter is also operated by the internal combustion engine via a belt, a consequent increase in the mechanical power absorbs from the internal combustion engine and hence in the fuel consumption.

US patent application No. 2007/0125106 describes instead an automotive air-conditioning system configured to implement a super-critical refrigerating cycle of the type illustrated with a dotted line in FIG. 1B, i.e. a refrigerating cycle wherein the refrigerating fluid, having been compressed to a pressure greater than its critical pressure $p_c$, does not condense and, along the high-pressure tract of the cycle, a thermal exchange between two gases occurs. As a consequence, differently from an air-conditioning system configured to implement a sub-critical refrigerating cycle, an air-conditioning system configured to implement a super-critical refrigerating cycle provides for the use of a radiator (i.e. a gas/gas heat exchanger) instead of a condenser.

In particular, the above-mentioned patent application teaches controlling, for the super-critical refrigerating cycle, the switching-on and the rotational speed of the radiator fan as a function of the difference $\Delta T$ between the refrigerant fluid temperature ($T_g$) leaving the radiator and the atmospheric temperature ($T_a$). Alternatively, still for the operation under super-critical conditions, the patent application cited above teaches controlling the switching-on and the rotational speed of the radiator fan as a function of the difference between the actual high pressure ($P_h$) as measured along the super-critical tract of the refrigerating cycle, and a target pressure ($P_{set}$) which is, in turn, a function of atmospheric temperature $T_a$.

For the condition wherein actual high pressure $P_h$ is less than the critical pressure of the refrigerating fluid and the radiator operates as a condenser, the patent application referred to above teaches instead a radically different approach for controlling the switching-on and the rotational speed of the fan. In particular, for sub-critical operating conditions, there is suggested that condensation pressure $P_h$ be not controlled, and that, at one time:

a) the super-cooling degree of the refrigerating fluid leaving the radiator be controlled and thereby kept within a predetermined range, by controlling the opening degree of an electronically controlled expansion valve, so as to enhance a coefficient of performance (COP) of the system; and b) the cooling capacity of the radiator be controlled by varying the fan speed in response to variations in the condensation pressure $P_h$.

This solution involves a major computational load for the electronic control unit of the air-conditioning system, since the latter has to implement both a control algorithm of the expansion valve and a control algorithm of radiator fan.

OVERVIEW

Some provide an automotive air-conditioning system configured to implement a sub-critical refrigerating fluid, wherein the fan control involves a computational load for the electronic control unit significantly reduced with respect to that entailed by the fan control carried out according to the teachings of US patent application 2007/0125106 described above, thus reducing at the same time the impact of the air-conditioning system the and energy balance of the engine.

According to some examples, there is provided an automotive air-conditioning system, as defined in the appended claims.

BRIEF DESCRIPTION OF THE DRAWINGS

For a better understanding of the present invention, embodiment thereof are now described, purely by way of non-limiting example, with reference to the attached drawings, wherein.

DETAILED DESCRIPTION

Figure 1A:
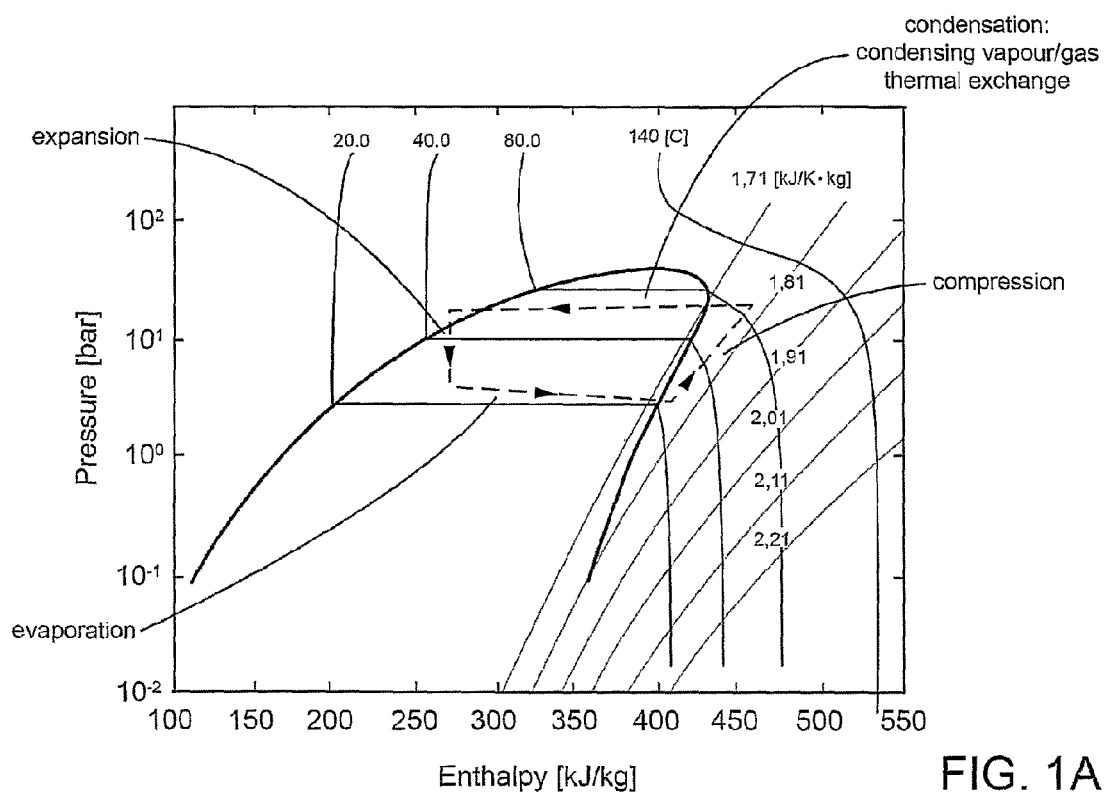
FIGS. 1A and 1B illustrate pressure/enthalpy diagrams of a sub-critical refrigerating cycle and of a super-critical refrigerating cycle, respectively.
Figure 1B:
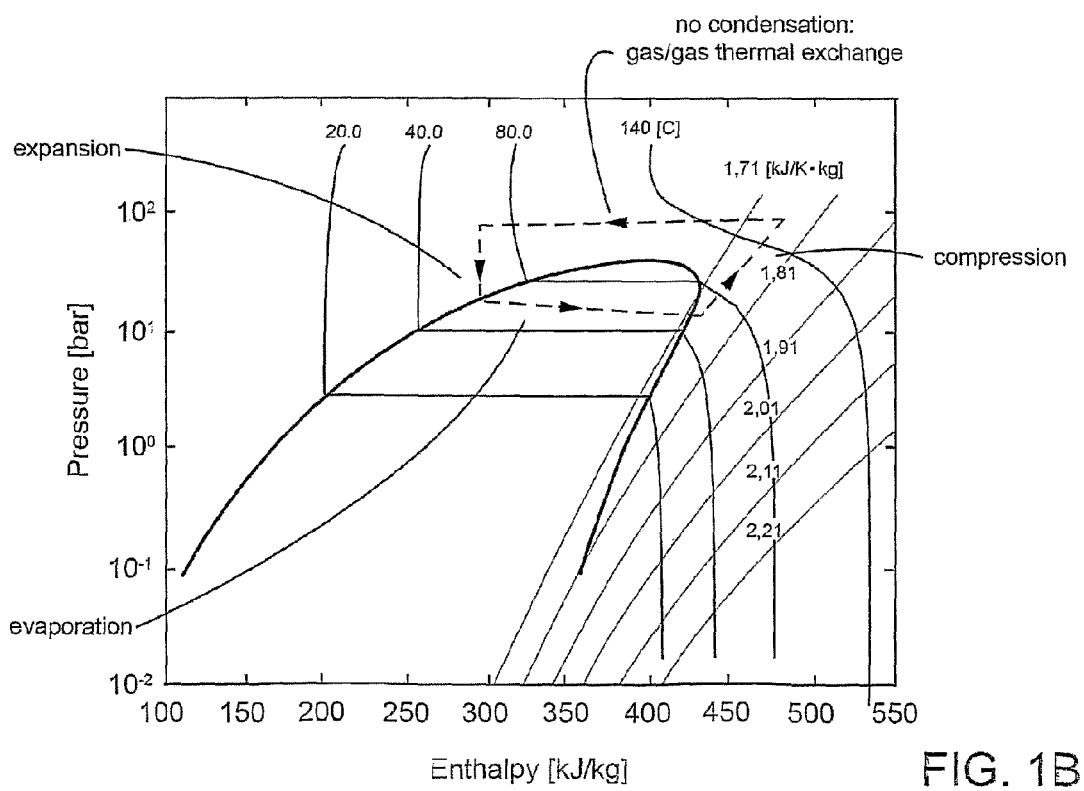
Figure 2:
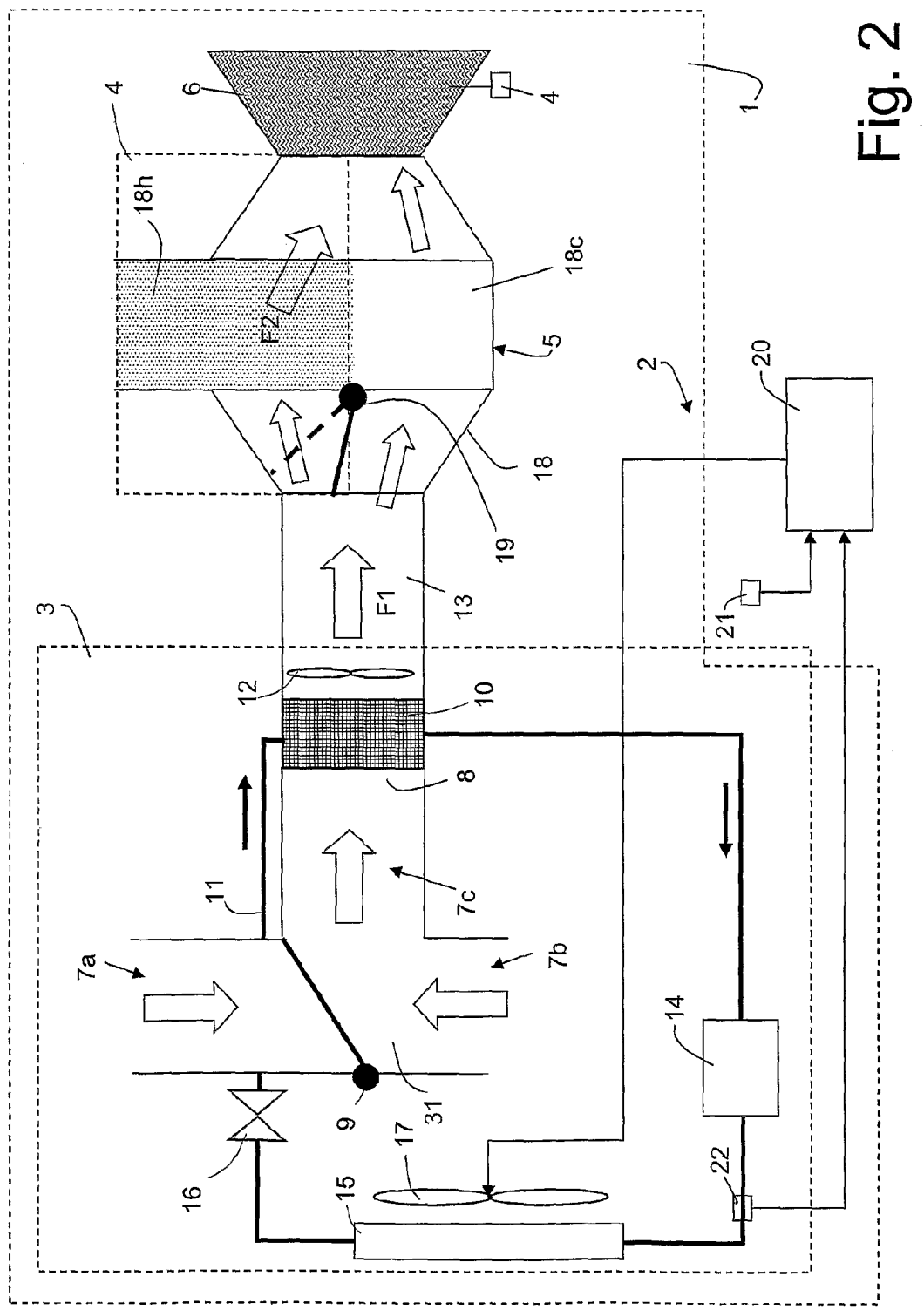
FIG. 2 shows a block diagram of a motor vehicle air-conditioning system configured to implement a sub-critical refrigerating cycle.

FIG. 2 shows an air-conditioning system, designated as a whole by 1, for a passenger compartment of a vehicle (not shown), in particular a road motor vehicle such as a car, a bus, etc.

The air-conditioning system 1 comprises a closed-loop cooling circuit 3 and a heating circuit 4, which are connected to one another via a mixer 5 provided with a diffuser 6 that introduces the conditioned air into the passenger compartment of the motor vehicle through air vents appropriately arranged within the passenger compartment.

In particular, the cooling circuit 3 is provided with an air-supply duct 7 having a first inlet 7a communicating with the outside of the motor vehicle, a second inlet 7b communicating with the passenger compartment of the motor vehicle, and an outlet 7c communicating with an inlet 8 of the mixer 5 through a duct 13. A selector 9 is arranged along the air-supply duct 7 for selectively connecting the outlet 7c with one or both of the inlets 7a, 7b. In this way, the air to be treated can be sucked selectively from the external environment and/or from the passenger compartment of the motor vehicle depending on the position of the selector 9.

The cooling circuit 3 further comprises a compressor 14, a condenser 15, an evaporator 10, and a non-electronically-controlled expansion valve 16, in particular of the mechanical type, which are connected through a duct 11 in which a coolant, for example Freon, flows.

In general, the compressor 14 is arranged in the engine compartment and is operated by the engine shaft of the internal-combustion engine of the motor vehicle via a belt; the condenser 15 is arranged on the front of the motor vehicle, in front of the radiator (not illustrated) so as to be impinged upon by the external air; and the evaporator 10 is usually arranged also in the engine compartment behind the firewall that separates the engine compartment from the passenger compartment of the motor vehicle and is arranged in an area at the outlet 7c of the air-supply duct 7 so as to be impinged upon by the air coming from the inlets 7a, 7b.

The compressor 14 has the task of compressing the coolant present in a vapour state at the evaporator outlet so as to increase its temperature and pressure. The coolant at the compressor outlet then flows through the condenser 15, where it yields heat to the air that traverses the condenser 15, so cooling and condensing, and hence passing from the gaseous state to the liquid state. The coolant then flows through the expansion valve 16, where it is cooled further and returns in part to the vapour phase. At this point, the coolant flows through the evaporator 10, where it absorbs heat from the air that traverses the evaporator 10, which air is cooled and is pushed into the mixer 5 via a fan 12, arranged along the duct 13 that connects the evaporator outlet with the mixer inlet 8. In this way, the coolant is heated, passing again to the vapour state, and is again supplied to the compressor 14, thus re-starting the cycle described above.

The cooling circuit 3 further comprises a fan 17 arranged in front of the condenser 15 in such a way as to provide a forced air flow on the condenser 15, towards the inside of the motor vehicle, thus determining a reduction in the temperature and pressure of the coolant in the condenser 15.

Once again with reference to FIG. 2, the mixer 5 defines an internal chamber 18, which communicates with the passenger compartment of the motor vehicle through the diffuser 6 and within which two paths 18h and 18c are defined, separate from one another and selectable by means of a selector 19 that supplies the air coming from the duct 13 to the paths 18h and 18c. In particular, the selector 19 can be positioned in a first limit position (indicated by the dashed line), where all the inlet air is supplied to the duct 18c, in a second limit position (not illustrated), where all the inlet air is supplied to the duct 18h, and in a plurality of intermediate positions, where the inlet air is partialized between the two ducts 18h and 18c.

The duct 18h moreover communicates with an outlet of the heating circuit 4, which, as is known, is conveniently constituted by a liquid/air heat exchanger, which receives the internal-combustion engine coolant through a control solenoid valve not shown in FIG. 2.

In the mixer 5, the cold air coming from the evaporator 10, before being introduced into the passenger compartment of the motor vehicle through the diffuser 6, can be mixed with hot air coming from the heating circuit 4. In particular, the cold air flow F1 generated by the fan 12 can be appropriately mixed with the hot air flow F2 coming from the heating circuit 4 by means of the selector 19, which can be positioned either in such a way as to convey the entire cold air flow F1 towards the diffuser 6 (so-called "all cold" position), without enabling any passage of cold air in the hot-air duct and thus preventing mixing of hot and cold air, or in such a way as to enable completely (so-called "all hot" position), or just in part, passage of the cold air flow F1 in the hot-air duct, and thus favour mixing of the cold and hot air flows F1 and F2 based on a target temperature set by the motor vehicle occupants (via appropriate temperature setting means provided in the passenger compartment).

Finally, the air-conditioning system 1 comprises an electronic control system 2, which in turn comprises, amongst other things:
- a temperature sensor 21, which may be conveniently, but not necessarily, arranged on a lower face of a rear-view mirror on the driver side (not illustrated), and supplies an electrical signal indicative of the ambient temperature $T_{ext}$ outside the motor vehicle, hereinafter referred to, for reasons of brevity, as "external ambient temperature";
- a pressure sensor 22 arranged at the condenser inlet and supplying an electrical signal indicative of a measured condensation pressure $P_{meas\_fluid}$ of the coolant in the condenser 15; and
- an electronic control unit 20 connected to the temperature sensor 21 and to the pressure sensor 22, and into which a control software has been loaded and stored, which is able, when executed, to control operation (switching-on, switching-off, and rotation speed) of the condenser fan 17 based on the signals from the aforesaid sensors in the way described in detail hereinafter with reference to FIG. 3, which shows a functional block diagram of the control software of the condenser fan stored in the electronic control unit 20.

Figure 3:
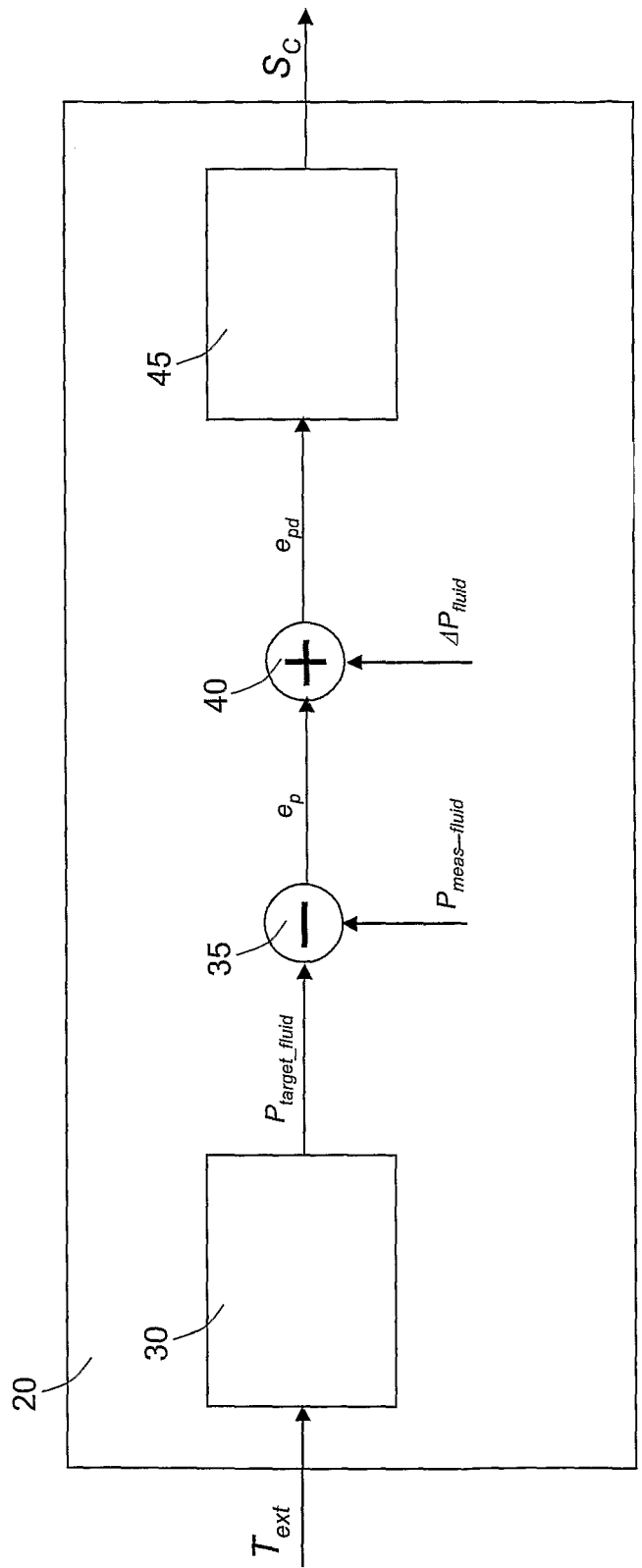
FIG. 3 shows a block diagram of an electronic control system of the air-conditioning system of FIG. 2.

As is shown in FIG. 3, when executed, the control software of the condenser fan stored in the electronic control unit 20 implements:
- a computation module 30 receiving the external ambient temperature $T_{ext}$ acquired by the temperature sensor 21 and supplying a target condensation pressure $P_{target\_fluid}$ of the coolant in the condenser 15, computed in the way described in detail hereinafter;
- a first subtractor module 35 receiving the target condensation pressure $P_{target\_fluid}$ and the measured condensation pressure $P_{meas\_fluid}$ of the coolant in the condenser 15 supplied by the computation module 30 and, respectively, by the pressure sensor 22, and supplying a pressure error $e_p$ equal to the difference between the measured condensation pressure $P_{meas\_fluid}$ and the target condensation pressure $P_{target\_fluid}$;
- a second subtractor module 40 receiving the pressure error $e_p$ and a pressure disturbance $\Delta P_{fluid}$, and supplying a purged pressure error $e_{pd}$ equal to the difference between the pressure error $e_p$ and the pressure disturbance $\Delta P_{fluid}$, wherein the pressure disturbance $\Delta P_{fluid}$ is a quantity estimated experimentally and representing neglected phenomena, compensated for by the control module described hereinafter, which tend to change the measured condensation pressure $P_{meas\_fluid}$ of the coolant, such as, for example, the motor vehicle speed or the ambient temperature in the passenger compartment of the motor vehicle set by occupants via appropriate setting elements of the air-conditioning system; and
- a control module 45 receiving the purged pressure error $e_{pd}$ and supplying a PWM control signal $S_C$ for the condenser fan 17, generated based on a control law described in what follows.

In particular, the computation module 30 is configured to compute the target condensation pressure $P_{target\_fluid}$ of the coolant in the condenser 15 according to a formula that is the result of an experimental bench-test campaign carried out by the Applicant in order to assess the influence of the use of the condenser fan 17 (in particular, of the air flowrate of the condenser fan 17) on the performance of the air-conditioning system 1 as the operating conditions of the air-conditioning system 1 vary.

In particular, during the experimental bench-test campaign, the performance of the air-conditioning system 1 was assessed based on the following merit parameters:
- an air temperature $T_{evap}$ downstream of the evaporator 10; and
- a performance coefficient COP of the air-conditioning system 1, computed according to the formula:

$$COP_{GEN} = \frac{W_{REFR}}{W_{MECC} + W_{ELE,VENT} + W_{ELE,EVAP}}$$

where:
- $W_{REFR}$ is a cooling capacity generated by the evaporator 10;
- $W_{MECC}$ is a mechanical power absorbed by the compressor 14;
- $W_{ELE\_VENT}$ is an electric power absorbed by the condenser fan 17; and
- $W_{ELE\_EVAP}$ is an electric power absorbed by the evaporator fan 12.

Based on these merit parameters, the Applicant has established that, by appropriately controlling, via an adequate use of the condenser fan 17, the coolant condensation pressure in the condenser 15 as a function of the external ambient temperature $T_{ext}$, it is possible to reduce the work of the compressor 14 and of the condenser fan 17 significantly, thus enabling a reduction in the mechanical power absorbed by the air-conditioning system 1 from the internal-combustion engine, and thus sensibly improving the overall energy balance.

In the specific case, the experimental bench-test campaign has made it possible to establish that for each external ambient temperature $T_{ext}$ there exists a target condensation pressure $P_{target\_fluid}$ of the coolant in the condenser 15 that optimizes the absorption of energy by the compressor 14 and by the condenser fan 17.

Figure 4:
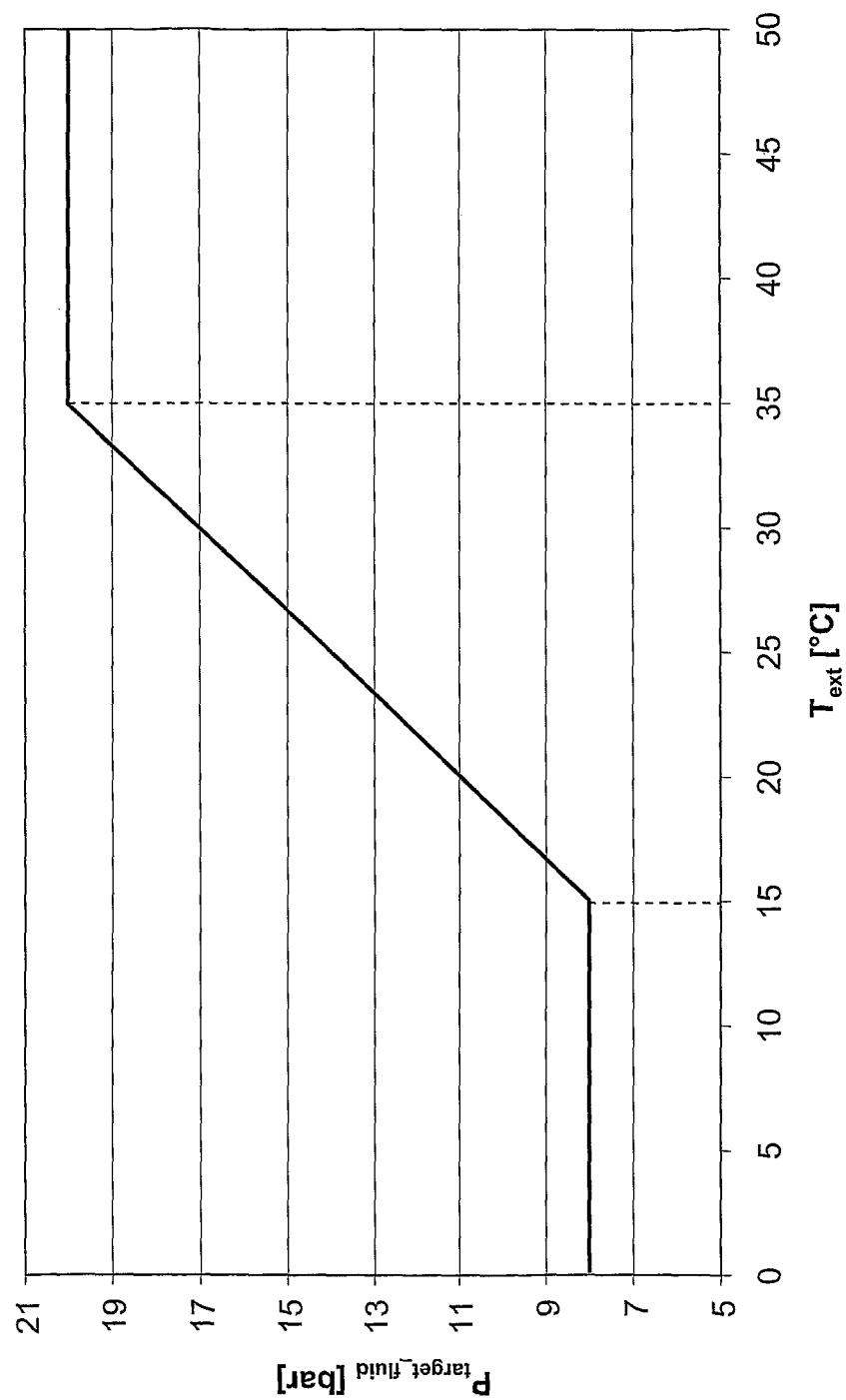
FIG. 4 shows a plot of a target condensation pressure of a coolant flowing in a condenser of the air-conditioning system of FIG. 2 versus an ambient temperature outside of the motor vehicle.

The optimal relation between the target condensation pressure $P_{target\_fluid}$ and the external ambient temperature $T_{ext}$ is shown in FIG. 4 and is represented by a broken line with three stretches, comprising:
- a first stretch where the target condensation pressure $P_{target\_fluid}$ is substantially constant at a value of approximately 8 bar for external ambient temperatures $T_{ext}$ lower than 15° C.;
- a second stretch linearly increasing according to the equation:

$$P_{target\_fluid} = 3/5 \cdot (T_{ext} - 15) + 8$$

during which the target condensation pressure $P_{target\_fluid}$ increases substantially linearly from 8 bar to 20 bar when the external ambient temperature $T_{ext}$ increases from 15° C. to 35° C.; and
- a third stretch, where the target condensation pressure $P_{target\_fluid}$ is substantially constant at a value of approximately 20 bar for external ambient temperatures $T_{ext}$ higher than 35° C.

Finally, in order to generate the control signal $S_C$ for the condenser fan 17, the control module 45 implements a transfer function F(s) of the type:

$$F(s) = \frac{a_2 s^2 + a_1 s + a_0}{b_2 s^2 + b_1 s + b_0}$$

which is nothing other than a frequency filter, the parameters of which can be obtained through a model-based design, an identification process via experimental tests, and a frequency analysis of the control loop.

From an examination of characteristics of the present sunject matter the advantages that it makes possible are evident.

In particular, it is emphasized that the Applicant has experimentally verified how the relationship between the target condensation pressure and the external ambient temperature illustrated in FIG. 4 enables a reduction of the work of the compressor and of the electrical absorption of the condenser fan, consequently reducing the absorption of energy of the air-conditioning system 1 and its impact on the overall energy balance of the motor vehicle.

In addition, the use of a non-electronically controlled expansion valve in an air-conditioning system implementing a sub-critical refrigerating cycle enables a significant reduction in the complexity of the software control of the condenser fan, and thereby a consequent reduction in the computational load of the electronic control unit of the air-conditioning system, an increase in the adaptability of the control of the condenser fan to the various operating conditions, and finally a reduction in the measurements necessary for providing said control.

Finally, it is clear that modifications and variations can be made to what has been described and illustrated herein, without thereby departing from the sphere of protection of the present invention, as defined in the annexed claims.

For example, the various additive and multiplicative constants in Eq. (2), as well as the temperature range within which the target condensation pressure is computed based on Eq. (2) and the two substantially constant values assumed by the target condensation pressure outside of said temperature range could differ from the ones indicated.

The invention claimed is:

1. An automotive air-conditioning system configured to implement a sub-critical refrigerating cycle and comprising a condenser and a fan associated thereto, a compressor, an evaporator, an expansion valve, and an electronic control system; wherein the expansion valve is non-electronically controlled, with the electronic control system configured to:
   receive a signal indicating an external ambient temperature ($T_{ext}$) outside a vehicle;
   receive a signal indicating a measured condensation pressure ($P_{meas\_fluid}$) of a coolant in the condenser;
   determine a target condensation pressure ($P_{target\_fluid}$) of the coolant in the condenser based on the external ambient temperature (Text);
   generate a condenser fan control signal (Sc) based on the measured condensation pressure($P_{means\_fluid}$) and the target condensation pressure ($P_{target\_fluid}$) of the coolant in the condenser;
   determine a pressure error (ep) indicative of a difference between the measured condensation pressure ($P_{meas\sim fluid}$) and the target condensation pressure ($P_{target\_fluid}$) of the coolant in the condenser; and
   generate the condenser fan control signal (Sc) based on the pressure error (ep).

2. The automotive air-conditioning system according to claim 1, further configured to:
   purge the pressure error ($e_p$) from a pressure disturbance ($\Delta P_{fluid}$); and
   generate the condenser fan control signal ($S_c$) based on the purged pressure error ($e_{pd}$) as to bring the measured condensation pressure ($P_{meas\_fluid}$) to being substantially equal to the target condensation pressure ($P_{target\_fluid}$) of the coolant in the condenser.

3. The automotive air-conditioning system according to claim 2, wherein the pressure disturbance ($\Delta P_{fluid}$) is associated with a changed measured condensation pressure ($P_{meas\_fluid}$).

4. The automotive air-conditioning system according to claim 3, wherein the changed measured condensation pressure is associated with at least one of a vehicle speed and an ambient temperature inside the passenger compartment of the vehicle that is set by a user via appropriate setting elements of the air-conditioning system.

5. The automotive air-conditioning system according claim 1, wherein the target condensation pressure (Ptarget_fluid) has a first substantially constant value associated with external ambient temperatures ($T_{ext}$) lower than a given lower ambient temperature, a second substantially constant value, different from the first substantially constant value, associated with external ambient temperatures ($T_{ext}$) higher than a given upper ambient temperature, and values comprised between the first and second substantially constant values associated with external ambient temperatures ($T_{ext}$) between the lower and upper ambient temperatures.

6. The automotive air-conditioning system according to claim 5, wherein the second substantially constant value is higher than the first substantially constant value.

7. The automotive air-conditioning system according to claim 6, wherein the target condensation pressure ($P_{target\_fluid}$) is configured to increase substantially linearly between the first and the second substantially constant values.

8. The automotive air-conditioning system according to claim 7, wherein in association with external ambient temperatures ($T_{ext}$) between the lower and upper ambient temperatures, the target condensation pressure ($P_{target\_fluid}$) is determined based on the following formula:

$$P_{target\_fluid} = k_1 \cdot (T_{ext} - k_2) + k_3$$

where $T_{ext}$ is the external ambient temperature outside the vehicle and $P_{target\_fluid}$ is the target condensation pressure.

9. The automotive air-conditioning system according to claim 8, wherein $k_1 = 3/5$, $k_2 = 15$ and $k_3 = 8$.

10. The automotive air-conditioning system according to claim 5, wherein the lower ambient temperature is approximately 15° C. and the upper ambient temperature is approximately 35° C.

11. The automotive air-conditioning system according to claim 5, wherein the first substantially constant value is approximately 8 bar and the second substantially constant value is approximately 20 bar.

12. The automotive air-conditioning system according to claim 1, comprising an electronic control unit programmed to generate the condenser fan control signal ($S_c$).

13. The automotive air-conditioning system according to claim 1, wherein the expansion valve is mechanical.

14. A vehicle comprising an automotive air-conditioning system, wherein the automotive air-conditioning system is configured to implement a sub-critical refrigerating cycle and comprises a condenser and a fan associated thereto, a compressor, an evaporator, an expansion valve, and an electronic control system, wherein the expansion valve is non-electronically controlled, and the electronic control system is configured to:

receive a signal indicating an external ambient temperature ($T_{ext}$) outside the vehicle;

receive a signal indicating a measured condensation pressure ($P_{meas\_fluid}$) of a coolant in the condenser;

determine a target condensation pressure ($P_{target\_fluid}$) of the coolant in the condenser based on the external ambient temperature (Text);

generate a condenser fan control signal (Sc) based on the measured condensation pressure(Pmeans_fluid) and the target condensation pressure (Ptarget_fluid) of the coolant in the condenser;

determine a pressure error (ep) indicative of a difference between the measured condensation pressure (Pmeas~fluid) and the target condensation pressure (Ptarget_fluid) of the coolant in the condenser; and generate the condenser fan control signal (Sc) based on the pressure error (ep).

15. The vehicle according to claim 14, wherein the vehicle is a motor vehicle.

16. A non-transitory computer readable storage medium stored thereon a software product loadable into an electronic control unit of an electronic control system of a motor vehicle air-conditioning system, which upon execution thereof, causes the electronic control unit to:

receive a signal indicating an external ambient temperature ($T_{ext}$) outside the vehicle;

receive a signal indicating a measured condensation pressure ($P_{meas\_fluid}$) of a coolant in a condenser of the air-conditioning system;

determine a target condensation pressure ($P_{target\_fluid}$) of the coolant in the condenser based on the external ambient temperature (Text);

generate a condenser fan control signal (Sc) based on the measured condensation pressure(Pmeans_fluid) and the target condensation pressure (Ptarget_fluid) of the coolant in the condenser;

determine a pressure error (ep) indicative of a difference between the measured condensation pressure (Pmeas~fluid) and the target condensation pressure (Ptarget_fluid) of the coolant in the condenser; and generate the condenser fan control signal (Sc) based on the pressure error (ep).

\* \* \* \* \*

UNITED STATES PATENT AND TRADEMARK OFFICE
CERTIFICATE OF CORRECTION

PATENT NO. : 8,682,526 B2  Page 1 of 1
APPLICATION NO. : 12/991670
DATED : March 25, 2014
INVENTOR(S) : Mola et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 591 days.

Signed and Sealed this
Twenty-ninth Day of September, 2015

Michelle K. Lee
*Director of the United States Patent and Trademark Office*